(12) United States Patent
Duchenne et al.

(10) Patent No.: US 8,363,171 B2
(45) Date of Patent: Jan. 29, 2013

(54) DOUBLE HINGE MONITOR MOUNT

(75) Inventors: Milan Duchenne, Rotterdam (NL); Erwin Schmit, Voorburg (NL); Noortje Bos, Eindhoven (NL)

(73) Assignee: GVBB Holdings S.A.R.L., Luxembourg (LU)

( * ) Notice: Subject to any disclaimer, the term of this patent is extended or adjusted under 35 U.S.C. 154(b) by 1204 days.

(21) Appl. No.: 11/986,948

(22) Filed: Nov. 27, 2007

(65) Prior Publication Data

US 2009/0273722 A1 Nov. 5, 2009

(51) Int. Cl.
*H04N 5/64* (2006.01)

(52) U.S. Cl. ........................................................ 348/838

(58) Field of Classification Search .................. 348/836, 348/837, 838, 839, 840, 841, 842, 843
See application file for complete search history.

(56) References Cited

U.S. PATENT DOCUMENTS

| | | | | |
|---|---|---|---|---|
| 5,719,799 A * | 2/1998 | Isashi | ........................... | 708/105 |
| 5,739,859 A * | 4/1998 | Hattori et al. | ................. | 348/375 |
| 5,982,429 A * | 11/1999 | Kamamoto et al. | ..... | 348/333.06 |
| 6,115,069 A * | 9/2000 | Kuroki et al. | ................. | 348/375 |
| 6,154,359 A * | 11/2000 | Kamikakai et al. | ...... | 361/679.27 |
| 6,392,871 B1 * | 5/2002 | Yanase | ..................... | 361/679.07 |
| 6,510,325 B1 * | 1/2003 | Mack et al. | ................. | 455/575.2 |
| 6,612,668 B2 * | 9/2003 | Doan | ......................... | 312/223.2 |
| 6,719,343 B2 * | 4/2004 | Emerling et al. | .......... | 296/24.34 |
| 6,771,494 B2 * | 8/2004 | Shimano | ................... | 361/679.06 |
| 6,840,791 B2 * | 1/2005 | Hsiu | .............................. | 439/374 |
| 6,845,546 B1 * | 1/2005 | Lu et al. | ........................... | 16/367 |
| 6,912,121 B2 * | 6/2005 | Karidis et al. | ........... | 361/679.06 |
| 7,046,286 B1 * | 5/2006 | Kobayashi et al. | ....... | 348/333.06 |
| 7,436,445 B2 * | 10/2008 | Hojo et al. | ................ | 348/333.01 |
| 7,467,000 B2 * | 12/2008 | Shiba | ........................... | 455/575.8 |
| 7,502,561 B2 * | 3/2009 | Lee et al. | ....................... | 396/536 |
| 7,515,826 B2 * | 4/2009 | Shibayama | .................... | 396/287 |

(Continued)

FOREIGN PATENT DOCUMENTS

| | | |
|---|---|---|
| EP | 0 708 557 A1 | 4/1996 |
| EP | 1 509 039 A | 2/2005 |

(Continued)

OTHER PUBLICATIONS

Search Report dated Apr. 24, 2007.

(Continued)

*Primary Examiner* — William Gilbert
*Assistant Examiner* — James Ference
(74) *Attorney, Agent, or Firm* — Arent Fox LLP

(57) ABSTRACT

A monitor mounting assembly (1) has a first hinge (2) arranged in a recess (3) of a housing (4). A monitor (6) is arranged flush with the housing (4) inside the recess (3) in a first position. The monitor (6) can be arranged in a second position by rotating the monitor (6) around the axis of rotation (7) of the first hinge (2). The angle of rotation of the first hinge (2) lies essentially between 0° and 90° degrees. A second hinge (11) is provided that has an axis of rotation (12) in a plane essentially parallel to the axis of rotation (7) of the first hinge (2). The second hinge (11) is arranged outside the recess (3) of the housing (4) when the first hinge (2) is substantially fully opened. A swivel joint (31) may be provided for rotating the monitor (6) around an axis of rotation (32) orthogonal to the axes of rotation of the first and the second hinge (7, 12).

7 Claims, 4 Drawing Sheets

U.S. PATENT DOCUMENTS

| | | | |
|---|---|---|---|
| 7,529,083 B2* | 5/2009 | Jeong | 361/679.04 |
| 7,636,984 B2* | 12/2009 | Oh | 16/374 |
| 7,667,959 B2* | 2/2010 | Pelkonen | 361/679.27 |
| 2001/0004269 A1* | 6/2001 | Shibata et al. | 348/333.06 |
| 2002/0163215 A1* | 11/2002 | Emerling et al. | 296/24.1 |
| 2003/0199187 A1* | 10/2003 | Hsiu | 439/218 |
| 2004/0004667 A1* | 1/2004 | Morikawa et al. | 348/333.06 |
| 2004/0174452 A1* | 9/2004 | Kinemura et al. | 348/333.06 |
| 2004/0212968 A1* | 10/2004 | Lin | 361/755 |
| 2005/0066474 A1* | 3/2005 | Hsu et al. | 16/330 |
| 2005/0186985 A1* | 8/2005 | Im et al. | 455/550.1 |
| 2005/0200739 A1* | 9/2005 | Ahn | 348/333.06 |
| 2006/0123593 A1* | 6/2006 | Shiba | 16/325 |
| 2007/0023598 A1* | 2/2007 | Kim et al. | 248/276.1 |

FOREIGN PATENT DOCUMENTS

| | | |
|---|---|---|
| JP | 64-48078 U | 3/1989 |
| JP | 09 163191 A | 6/1997 |
| JP | 2004-104832 A | 4/2004 |
| JP | 2005-295481 A | 10/2005 |
| JP | 2006-138958 A | 6/2006 |

OTHER PUBLICATIONS

Abstract of JP 2006-138958 published Jun. 1, 2006.
Abstract of JP 2004-104832 published Apr. 2, 2004.
Abstract of JP 2005-295481 published Oct. 20, 2005.
Notice of Reasons for Rejection in Japanese Application No. 2007-313754 mailed Jun. 26, 2012.

* cited by examiner

DOUBLE HINGE MONITOR MOUNT

This application claims the benefit, under 35 U.S.C. §119, of European Patent Application No. 06301209.0 on 4 Dec. 2006.

FIELD OF THE INVENTION

The invention relates to a monitor mount in a camera, in particular to a mount for a flat screen monitor, e.g. an LCD monitor.

BACKGROUND OF THE INVENTION

Modern video cameras for consumer or professional use are provided with a monitor as a viewfinder and for watching the recording. The screen may be relatively large, and it is desirable to have a screen that can be moved into various directions, allowing for putting the screen in a position such that the camera operator always has a good view of the scene that is recorded, no matter how the camera is held. A movable screen further has the advantage of allowing for putting the screen in a position where ambient light does not affect the visibility and readability of what is reproduced on the screen. The terms screen and monitor are used synonymously throughout the specification, unless otherwise stated.

Consumer video cameras often provide a screen that can be adjusted flush with the housing when in travelling position. A single hinge is provided to open the screen towards the user. Some consumer video cameras also provide a pivoting means with the single hinge, allowing for further rotating the screen to a convenient viewing position when fully opened, or for swiveling the screen by 180 degrees and then folding the screen back into the housing. However, once the screen is fully opened, a force applied to the hinge trying to further open the screen may lead to breaking either the screen or the hinge, causing severe damage to the camera.

SUMMARY OF THE INVENTION

In a video camera it is, therefore, desired to have a foldable monitor or screen which, when in travelling position, is in a position flush with then housing. It is further desired to allow for a movement of the monitor corresponding to opening the monitor wider than 90 degrees. Yet further a rotation of the monitor orthogonal to the hinge axis is also desirable.

These and other objects are achieved by a monitor mounting assembly as defined in independent claim 1. Advantageous developments and embodiments are defined in the dependent claims.

A monitor mounting assembly according to a first aspect of the invention has a first hinge arranged in a recess of a housing. A monitor is arranged flush with the housing inside the recess in a first position. The monitor can be arranged in a second position by rotating the monitor around the axis of rotation of the first hinge. The angle of rotation of the first hinge lies essentially between 0° and 90° degrees. A second hinge is provided that has an axis of rotation in a plane essentially parallel to the axis of rotation of the first hinge. The second hinge is arranged outside the recess of the housing when the first hinge is substantially fully opened. Thus, when the maximum opening angle of the first hinge is reached, the second hinge allows for further opening the screen.

The angle of rotation of the first hinge may be limited by a mechanical stop. The mechanical stop may be provided by the rim of the recess.

In one embodiment of the invention the second hinge is arranged at a distance from the first hinge equal or larger than the sum of the distance between the axis of rotation of the first hinge and the outer surface of the housing and the distance between the axis of rotation of the second hinge and the outer surface of the monitor. This allows for folding the monitor towards the outer surface of the housing until the monitor lies essentially flat against the housing.

In a preferred embodiment the torques required for operating the first and the second hinge are set to be noticeably different from each other. The torque required for operating the first hinge is preferably set to be lower than the torque required for operating the second hinge, thereby ensuring that during normal operation the first hinge is fully opened before the second hinge comes into action. This also provides a properly defined way of operation, which may be desirable for giving a sturdier and more reliable impression to an operator. The noticeable difference in the torques for operating preferably exceeds mere differences due to production tolerances.

In another embodiment a mechanical resistance is provided with the second hinge. The mechanical resistance can be overcome by applying a torque noticeably exceeding the torque required for normally operating the second hinge. This ensures that, during normal operation, the monitor is rotated only about the first hinge, while providing a further movement as a safety feature. In case the monitor is fully rotated open about the first hinge and a person or object unintendedly collides with the monitor, applying a force in a direction so as to further open the monitor, the second hinge provides for the required movement. This further movement of the monitor can prevent a camera equipped with the inventive monitor mounting assembly from toppling over, or the monitor or hinge from breaking, while not affecting the normal use. In one embodiment, the mechanical resistance is provided by a spring-loaded or flexible pin engaging with a notch. In another embodiment the mechanical resistance is provided by the second hinge being spring-loaded in axial direction and having a pin or a notch, the pin or notch engaging with a corresponding notch or pin.

In a development of the invention a swivel joint is provided for rotating the monitor around an axis of rotation orthogonal to the axes of rotation of the first and the second hinge. This additional joint allows for rotating the screen when opened, providing additional ways of orienting the monitor, e.g. for avoiding ambient light influencing the readability of the monitor. This additional joint also allows for rotating the monitor by 180 degrees and folding it back into the recess of the housing so that it is fully visible yet flush with the housing.

In one embodiment of the development, the swivel joint connects the first and the second hinge.

BRIEF DESCRIPTION OF THE DRAWINGS

The invention will be described in greater detail with reference to the drawing, in which.

DETAILED DESCRIPTION OF PREFERRED EMBODIMENTS

Figure 1:
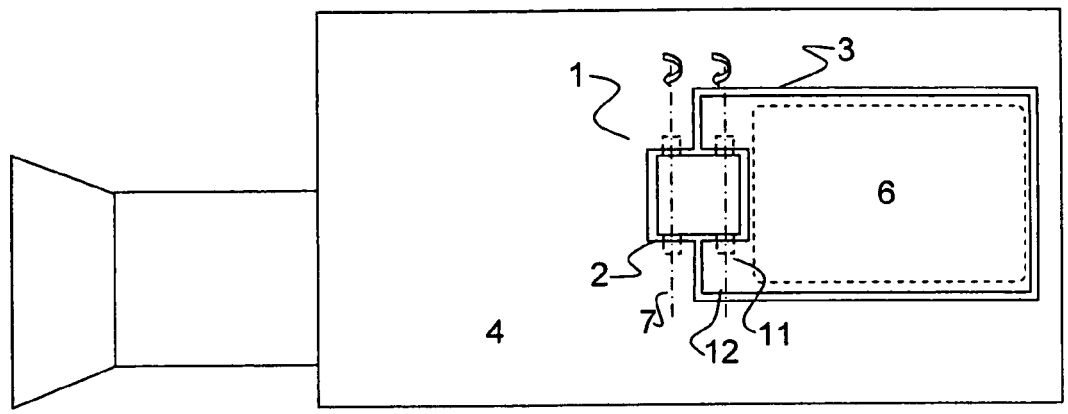
FIG. 1 shows a diagrammatic side view of a camera with a monitor mount assembly according to a first embodiment of the invention.

In the drawing, same or similar elements are referenced by the same reference symbols.

FIG. 1 shows a diagrammatic side view of a camera with a monitor mount assembly 1 according to a first embodiment of the invention in a first position. The monitor mount assembly includes a first hinge 2 and a second hinge 11 arranged in a recess 3 of a housing 4. The recess 3 is shown as a rectangular line surrounding the monitor mount assembly 1 and a monitor 6. The monitor 6 is shown from its rear side, indicated by the dashed line. The axes of rotation 7, 12 first and the second hinge 2, 11 are indicated by the dash-dotted line and the curved arrows depicting the rotation.

Figure 2:
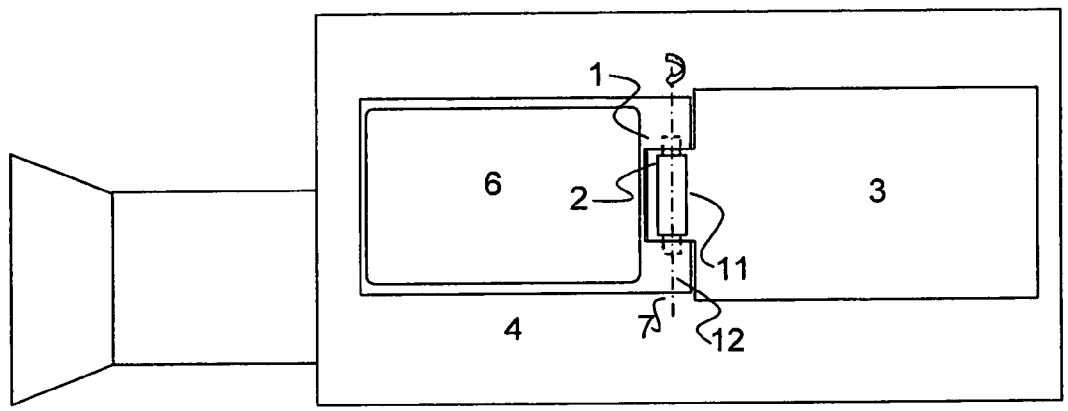
FIG. 2 shows a diagrammatic side view of the camera and monitor mount assembly of FIG. 1 with the monitor in a different position.

FIG. 2 shows a diagrammatic side view of the camera with a monitor mount assembly 1 of FIG. 1 with the monitor 6 in a second position. The monitor 6 is now fully opened and the rear side of the monitor 6 lies flush with the housing 4. The recess 3 is now empty. The first and the second hinge 2, 11 are now arranged one over the other, as are the axes of rotation 7, 12. The position of the first and second hinge 2, 11 is indicated by the single visible hinge and the single visible axis of rotation. This position of the monitor 6 may have been achieved by first fully turning the monitor 6 around the first hinge 2 and then turning the monitor 6 around the second hinge 11. The first hinge 2 may not be opened further, as will be discussed later.

Figure 3:
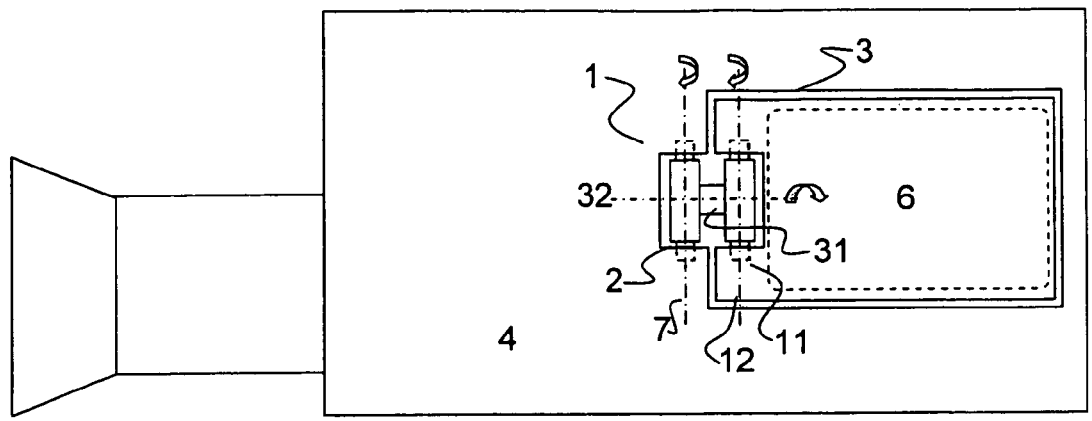
FIG. 3 shows a diagrammatic side view of a camera with a monitor mount assembly according to a second embodiment of the invention.

FIG. 3 shows a diagrammatic side view of a camera with a monitor mount assembly 1 according to a second embodiment of the invention in a first position. The elements are essentially the same as discussed in FIGS. 1 and 2. An additional swivel joint 31 is provided in the monitor mount assembly 1. The swivel joint 31 has an axis of rotation 32 essentially orthogonal to the axes of rotation 7, 12 of the first and the second hinge 2, 11. The possible rotation of the swivel joint 31 is indicated by the curved arrow.

Figure 4:
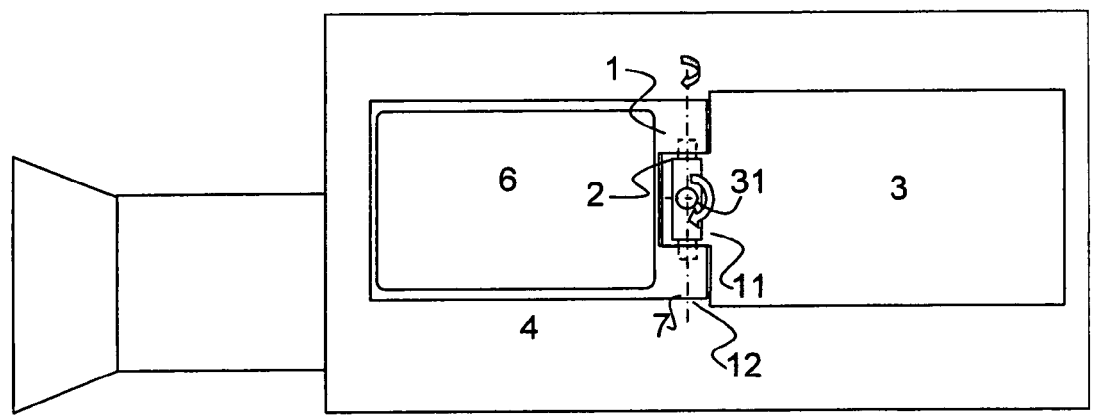
FIG. 4 shows a diagrammatic side view of the camera and monitor mount assembly of FIG. 3 with the monitor in a second position.

FIG. 4 shows a diagrammatic side view of the camera with a monitor mount assembly 1 of FIG. 3 in a second position. This figure is similar to FIG. 2 and shows corresponding elements. The swivel joint 31 is shown in a position that allows for turning the monitor 6 in a plane parallel to the surface of the drawing, as also indicated by the curved arrow. If the monitor 6 were set in a position corresponding to a fully opened first hinge 2, the swivel joint 31 would allow for changing the angle of the front side of the monitor 6 with respect to a user behind the camera (not shown in the figure). This embodiment also allows for arranging the monitor 6 such that is faces towards the outside of the recess 3, while being arranged inside the recess 3 (not shown in the figure).

Figure 5:
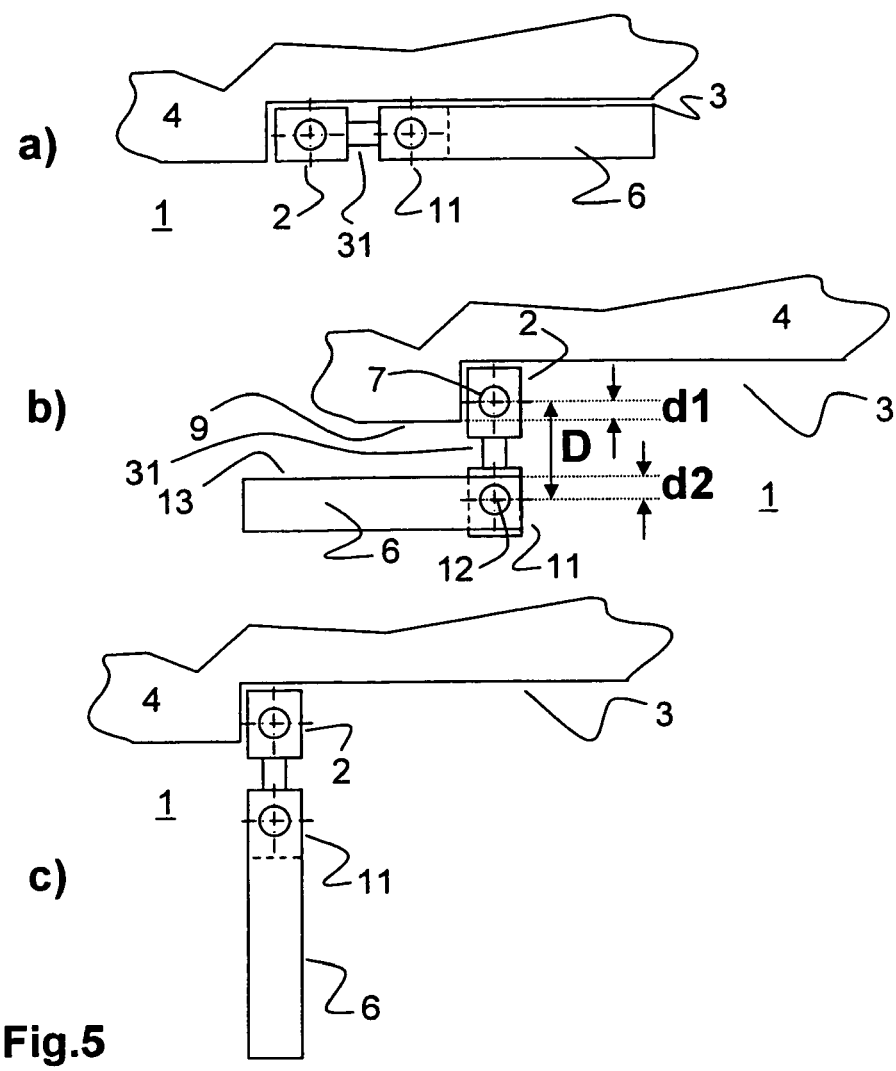
FIG. 5 shows a detail of the monitor mount assembly in three different positions in a sectional view.

FIG. 5 shows a detail of the monitor mount assembly 1 in three different positions in a sectional view. In FIG. 5a) the monitor 6 is arranged flush with the housing 4 inside the recess 3. The first and the second hinge 2, 11 are also arranged inside the recess 3. The first and the second hinge 2, 11 are linked by the swivel joint 31. The monitor 6 may face to the inside of the recess 3 or to the outside. In FIG. 5b) the first and the second hinge 2, 11 are fully opened, and the monitor 6 lies flush with the housing 4 outside the recess 3. The minimum distance D between the first and the second hinge 2, 11 equals the sum of the distance d1 between the axis of rotation 7 of the first hinge 2 and the outer surface 9 of the housing and the distance d2 between the axis of rotation 12 of the second hinge 11 and the outer surface 13 of the monitor 6. In the drawing, the outer surface 13 of the monitor 6 is facing towards the outer surface 9 of the housing 4. It is to be noted that the distances shown in the figure are exaggerated for clarity reasons. However, the distance between the first and the second hinge 2, 11 may deliberately be chosen to be larger as the minimum required distance. FIG. 5c) shows the monitor 6 in a normal position, facing towards the user of the camera (not shown in the figure).

Figure 6:
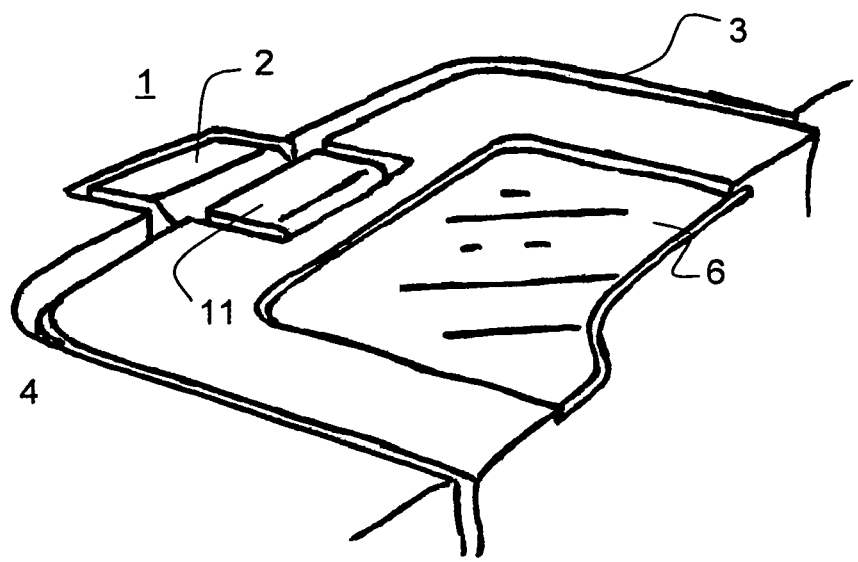
FIG. 6 is a perspective view of a detail of the monitor mount assembly according to the invention.

FIG. 6 is a perspective view of a detail of the monitor mount assembly 1 according to the invention. The monitor 6 is arranged inside the recess 3 of the housing 4, facing outside. The first and second hinge 2, 11 are also arranged inside the recess 3.

Figure 7:
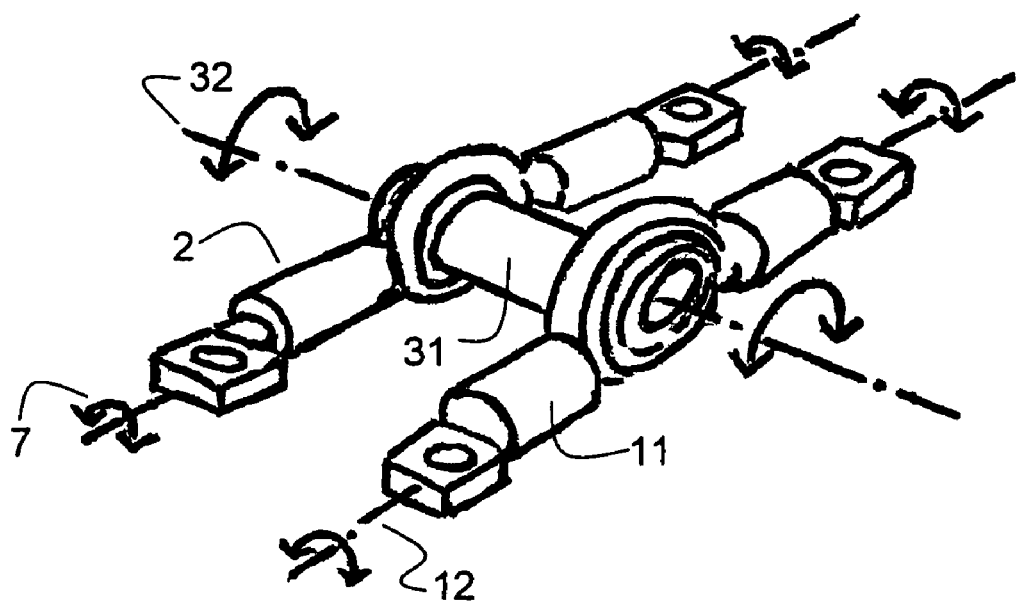
FIG. 7 is a perspective view of an exemplary hinge assembly used in the monitor mount assembly according to the invention.

FIG. 7 is a perspective view of an exemplary hinge assembly used in the monitor mount assembly 1 according to the invention. A first and second hinge 2, 11 and their axes of rotation 7, 12 are shown, indicated by the curved arrows. A swivel joint 31 is provided, connecting the first and the second hinge 2, 11. The axis of rotation 32 of the swivel joint 31 is also indicated in the figure.

Figure 8:
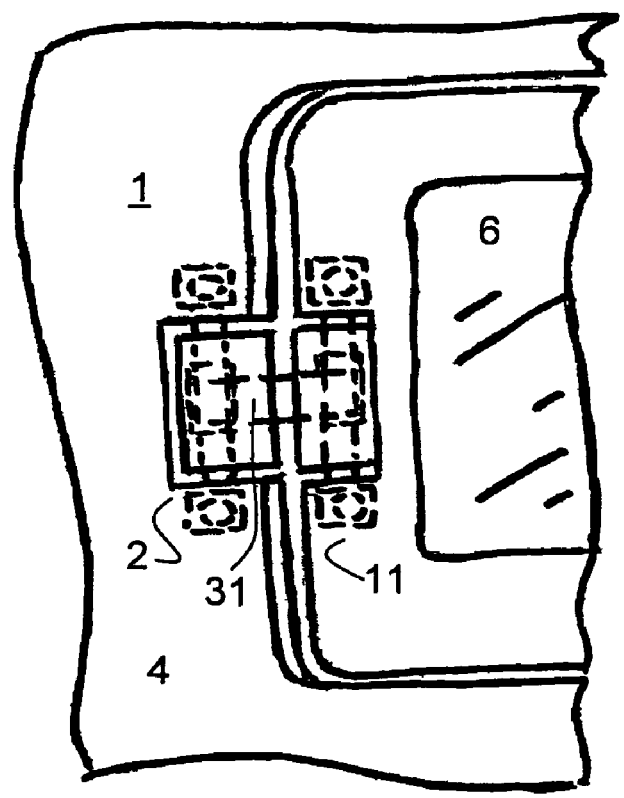
FIG. 8 diagrammatically shows the position of the exemplary hinge assembly of FIG. 7 in the monitor mount assembly according to the invention.

FIG. 8 diagrammatically shows how the exemplary hinge assembly of FIG. 7 is arranged in the monitor mount assembly 1 according to the invention. The dashed lines indicate that the hinge assembly is at least partly covered by the housing 4 and the monitor 6. The first and the second hinge 2, 11 as well as the swivel joint 31 are shown in the figure.

Although the invention has been described with reference to a monitor mount for a camera it will be obvious to the person skilled in the art to use the invention in other applications in which a monitor is to be foldable arranged in a recess while allowing a large degree of movement.

What is claimed is:

1. A monitor mounting assembly having a first hinge arranged in a recess of a housing having a rim, wherein a monitor is arranged flush with the housing inside the recess in a first position, and wherein the monitor can be arranged in a second position by rotating the monitor around the axis of rotation of the first hinge, wherein the angle of rotation lies essentially between 0° and 90° degrees, wherein a second hinge is provided having an axis of rotation in a plane essentially parallel to the axis of rotation of the first hinge, wherein the second hinge is arranged outside the recess of the housing when the first hinge is substantially fully opened, and wherein torques required for operating the first and the second hinge are set to be different from each respective hinge, the torque required for operating the first hinge being lower than the torque required for operating the second hinge such that the first hinge rotates to the second position before the second hinge operably rotates in response to the torque for operating the second hinge.

2. Monitor mounting assembly according to claim 1, wherein the angle of rotation of the first hinge is limited by a mechanical stop, in particular by the rim of the recess.

3. Monitor mounting assembly according to claim 1, wherein the second hinge is arranged at a distance from the first hinge equal to or larger than the sum of the distance between the axis of rotation of the first hinge and the outer surface of the housing and the distance between the axis of rotation of the second hinge and the outer surface of the monitor.

4. Monitor mounting assembly according to claim 1, wherein a mechanical resistance is provided with the second hinge, wherein the mechanical resistance can be overcome by applying a torque exceeding the torque required for normally operating the second hinge.

5. Monitor mounting assembly according to claim 4, wherein the mechanical resistance is provided by the second hinge, wherein the second hinge is spring-loaded.

6. Monitor mounting assembly according to claim 1, wherein pivoting swivel joint is provided for rotating the monitor around an axis of rotation orthogonat to the axes of rotation of the first and the second hinge.

7. Monitor mounting assembly according to claim 6, wherein the pivoting swivel joint connects the first and the second hinge.

* * * * *